G. W. LLEWELLYN.
DISINFECTANT HOLDER.
APPLICATION FILED NOV. 11, 1908.

917,779.

Patented Apr. 13, 1909.

Witnesses
M. C. Lyddane
J. D. F. Mulhall

Inventor
George W. Llewellyn
By Joshua R. H. Potts
Attorney

UNITED STATES PATENT OFFICE.

GEORGE W. LLEWELLYN, OF PHOENIXVILLE, PENNSYLVANIA, ASSIGNOR OF ONE-HALF TO SAMUEL W. DININGER, OF PHOENIXVILLE, PENNSYLVANIA.

DISINFECTANT-HOLDER.

No. 917,779.     Specification of Letters Patent.     Patented April 13, 1909.

Application filed November 11, 1908. Serial No. 462,102.

*To all whom it may concern:*

Be it known that I, GEORGE W. LLEWELLYN, a citizen of the United States, residing at Phoenixville, in the county of Chester and State of Pennsylvania, have invented certain new and useful Improvements in Disinfectant-Holders, of which the following is a specification.

My invention relates to improvements in disinfectant holders, the object of the invention being to provide an improved cartridge or shell and improved hanger therefor, which will support the cartridge or shell in the line of flow of the water, so as to thoroughly impregnate the water with the disinfectant, and leave the urinal, bowl or other device, in which it is to be used, clean and sweet after each and every flushing operation.

A further object is to provide improvements of this character, of extremely simple, inexpensive construction, which can be easily recharged and which is capable of use with either dry or liquid disinfectants.

With these and other objects in view the invention consists in certain novel features of construction, and combinations and arrangements of parts as will be more fully hereinafter described and pointed out in the claims.

Figure 1:
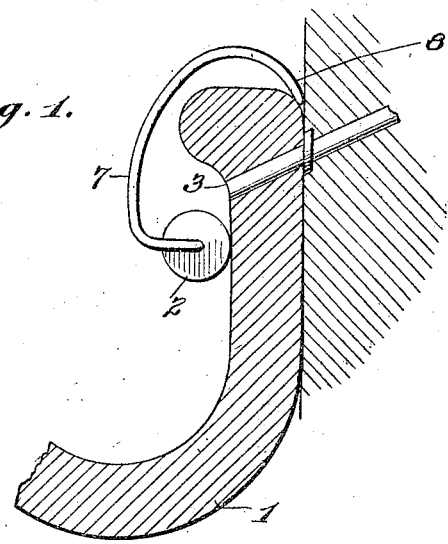
Figure 2:
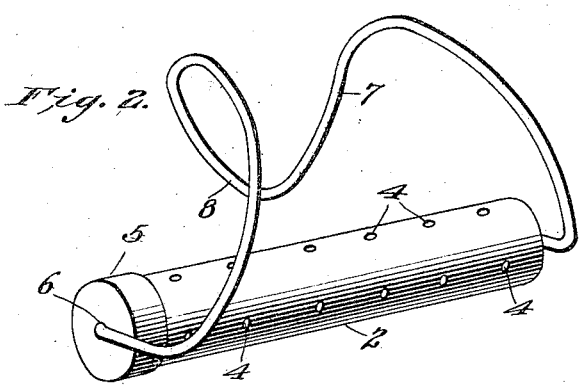
Figure 3:
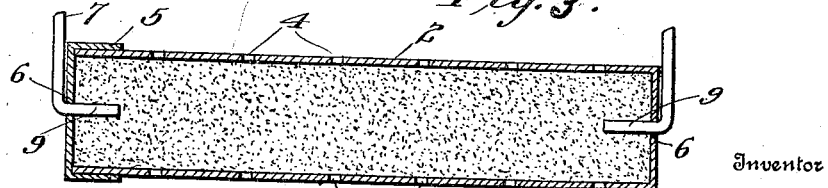

In the accompanying drawings Figure 1, is a view illustrating my improvements in position in a bowl. Fig. 2, is a view of my improvements detached, and Fig. 3, is a view in longitudinal section.

1 represents a bowl and 2 the cartridge or shell of my improved attachment, supported in the bowl in the path of the water, which is illustrated as entering the bowl at 3.

The cartridge or shell is composed of metal or other suitable material, and is perforated throughout its length as at 4, and is shown of general cylindrical form, but may be made of various other shapes. A removable cap 5 is located on the open end of the shell and this cap 5 and the closed end of the shell are made with central perforations 6 to receive the ends of my improved hanger 7.

The hanger 7 comprises a single piece of spring wire bent between its ends forming a spring tongue 8 to engage over a bowl or other device, and the ends of the hanger are bowed apart, and bent at right angles forming studs 9 projecting into the end perforations in the shell and cap, and supporting the shell in such a way that it is free to revolve.

By removing the cap 5 the shell can be filled with any desired disinfectant, and when the cap is replaced and the hanger in position, the device is ready for attachment to a bowl, urinal, or to any other water flushing device where a disinfectant is desirable. The shell is located in the passage of the water flow, and the water by reason of its contact with the perforated side walls of the shell will be thoroughly impregnated with the disinfectant, and will cause the shell to revolve, and hence equally utilize all sides of the shell and the disinfectant therein.

I would have it understood that I do not restrict myself to the shape of the shell, to the material used in making the shell, nor to any particular kind or character of disinfectant, but consider myself at liberty to make such changes and alterations as fairly fall within the spirit and scope of my invention.

Having thus described my invention what I claim as new and desire to secure by Letters Patent is:

1. In a device of the character described, a perforated cartridge or shell to contain disinfectant, and having central perforations in its ends, a wire bent between its ends forming a supporting tongue, and bent at its ends and projecting into the end perforation in the shell to give rotary support to the latter.

2. In a device of the character described, a perforated cartridge or shell to contain disinfectant, and central perforations in its closed end, a removable cap on the open end of the shell having a central perforation therein, a spring wire bent between its ends to form a spring supporting tongue, and the ends of the wire bowed apart, and bent inward at right angles and projected into the central perforations in the end of the cartridge or shell and the cap, giving rotary mounting to the cartridge.

3. In a device of the character described, the combination with a water flushing apparatus, of a disinfectant containing perforated cartridge or shell having a removable cap at one end, a wire bent between its ends to form a tongue to engage over the edge of a water flushing apparatus, and bent at its ends and projected into the ends of the cartridge or shell, and giving rotary support to the latter in the passage of water flow, whereby the stream of water will revolve the cartridge, and take disinfectant from all of its perforations.

In testimony whereof I have signed my name to this specification in the presence of two subscribing witnesses.

GEORGE W. LLEWELLYN.

Witnesses:
 H. D. KEELY,
 S. SHERMAN CHALFANT.